United States Patent
Ker et al.

(10) Patent No.: US 7,817,390 B2
(45) Date of Patent: Oct. 19, 2010

(54) POWER-RAIL ESD PROTECTION CIRCUIT WITH ULTRA LOW GATE LEAKAGE

(75) Inventors: Ming-Dou Ker, Hsinchu (TW); Chin-Hao Chen, Jhonghe (TW); Ryan Hsin-Chin Jiang, Taipei (TW)

(73) Assignee: Amazing Microelectronic Corp., Jhonghe, Taipei (TW)

( * ) Notice: Subject to any disclaimer, the term of this patent is extended or adjusted under 35 U.S.C. 154(b) by 0 days.

(21) Appl. No.: 12/461,237

(22) Filed: Aug. 5, 2009

(65) Prior Publication Data

US 2009/0296295 A1    Dec. 3, 2009

Related U.S. Application Data

(62) Division of application No. 11/987,222, filed on Nov. 28, 2007, now Pat. No. 7,755,871.

(51) Int. Cl.
*H02H 9/04* (2006.01)
(52) U.S. Cl. ...................................................... 361/56
(58) Field of Classification Search ................... 361/56, 361/111
See application file for complete search history.

(56) References Cited

U.S. PATENT DOCUMENTS

| 4,797,899 | A | * | 1/1989 | Fuller et al. ................. 375/219 |
|---|---|---|---|---|
| 5,946,177 | A | | 8/1999 | Miller et al. |
| 6,385,021 | B1 | | 5/2002 | Takeda et al. |
| 6,724,603 | B2 | | 4/2004 | Miller et al. |
| 6,989,979 | B1 | | 1/2006 | Tong et al. |
| 2004/0109270 | A1 | * | 6/2004 | Stockinger et al. ............ 361/56 |
| 2006/0050451 | A1 | * | 3/2006 | Jen-Chou ..................... 361/56 |
| 2009/0273955 | A1 | * | 11/2009 | Tseng et al. .................. 363/60 |

* cited by examiner

*Primary Examiner*—Jared J Fureman
*Assistant Examiner*—Angela Brooks
(74) *Attorney, Agent, or Firm*—Stites & Harbison, PLLC; Juan Carlos A. Marquez, Esq

(57) ABSTRACT

An ESD protection circuit including a clamping module and a detecting module is provided. The clamping module is coupled between a positive power line and a negative power line. The detecting module includes a triggering unit, a resistor, and a MOS capacitor. An output terminal of the triggering unit is used for triggering the clamping module. The resistor is coupled between the negative power line and an input terminal of the triggering unit. The MOS capacitor is coupled between the positive power line and an input terminal of the triggering unit for ESD protection. During a normal power operation, a switching terminal of the triggering unit enables the MOS capacitor to be coupled between the negative power line and an input terminal of the triggering unit. Thereby, the gate tunneling leakage is eliminated and the problem of mistriggering is prevented.

9 Claims, 4 Drawing Sheets

US 7,817,390 B2

POWER-RAIL ESD PROTECTION CIRCUIT WITH ULTRA LOW GATE LEAKAGE

CROSS-REFERENCE TO RELATED APPLICATION

This application is a Divisional of U.S. application Ser. No. 11/987,222 filed Nov. 28, 2007 now U.S. Pat. No. 7,755,871. This application claims priority to U.S. application Ser. No. 11/987,222 filed Nov. 28, 2007, which is incorporated by reference.

BACKGROUND OF THE INVENTION

1. Field of the Invention

The present invention relates to a power-rail electrostatic discharge (ESD) protection circuit. In particular, the present invention relates to a power-rail ESD protection circuit with ultra-low gate leakage.

2. Description of the Prior Art

In CMOS technology, the device dimension of transistor has been scaled toward the nanometer region. As MOS transistors get smaller and the gate oxide gets thinner, tunneling current through the isolation barrier becomes a non-negligible component with a potential impact on circuit operation and performance. More specifically, the high gate current will render traditional power-rail ESD clamps circuit mal-functional, necessitating modification to existing circuits to minimize sensitivity to the MOS capacitor gate tunneling leakage.

A power-rail ESD clamp circuit provides a low-impedance path from VDD to VSS for ESD current. FIG. 1 shows the classic RC-triggered power-rail ESD clamp circuit. Under normal circuit operation conditions, the input end of the inverter has a high voltage level. Accordingly, the output end of the inverter has a low voltage level and the clamping device 12 (i.e. the NMOS) is turned off. Once VDD is zapped by a positive ESD stress with VSS grounded, the input end of the inverter initially has a low voltage level relative to that of VDD. Therefore, the output end of the inverter generates a high voltage level and turns the ESD clamping device 12 on to provide a low-impedance path from VDD to VSS to discharge the ESD current.

FIG. 2 shows a classic CR-coupled power-rail ESD clamp circuit. These circuits, or a minor variation of them, have been widely used in ESD protection. Key design parameters for such power supply clamp include the clamped voltage, the layout area, the quiescent VDD to VSS leakage current, and the immunity to mistriggering during normal operation and power-up conditions.

In the circuits shown in FIG. 1 and FIG. 2, the capacitors are formed with metal-oxide-semiconductor field-effect transistors (MOSFETs). In practice, this necessitates the use of a large area capacitor. A thin gate oxide MOS can product larger capacitance than thick gate oxide MOS in the same area. The thin gate oxide MOS capacitor can be used to reduce the ESD protection circuit area but suffering gate tunneling leakage.

For advanced technologies with very thin gate oxide. The thinner gate oxide MOS capacitor gets the smaller capacitor area. The thin gate oxide MOS capacitor in the detecting circuit 14 is associated with significant stand-by power consumption because of the large gate tunneling leakage current. Further, the large gate leakage current of the classic RC-triggered power-rail clamp circuit and CR-coupled power-rail clamp circuit may cause the clamping device 12 mistriggered. Due to these problems, modified power clamps with a ultra-low gate leakage are highly desirable. The requirement for an improved power-rail ESD clamp circuit is not just reduction of the capacitor size, but reduction of the gate leakage current at the same time to avoid mistriggering the clamping device 12.

SUMMARY OF THE INVENTION

The main scope of the invention is to provide ESD protection circuits for solving the aforementioned problems. According to the invention, the connecting configuration of this gate oxide MOS capacitor is variable under different operation conditions.

An embodiment according to the invention is an ESD protection circuit including a clamping module and a detecting module. The clamping module is coupled between a positive power line and a negative power line. The detecting module includes a triggering unit, a resistor, and a thin gate oxide MOS capacitor. The triggering unit has an input terminal, an output terminal, and a switching terminal. The output terminal is coupled to and used for triggering the clamping module. The resistor is coupled between the negative power line and the input terminal of the triggering unit. The thin gate oxide MOS capacitor has a first end and a second end. The first end is coupled to the input terminal of the triggering unit; the second end is switched to the positive power and negative power by switch terminal of trigger unit to solve the thin gate oxide leakage problem.

During a normal power operation, the switching terminal of the triggering unit enables the second end of the MOS capacitor to be coupled with the negative power line. In an ESD event, the switching terminal of the triggering unit enables the second end of the MOS capacitor to be coupled with the positive power line. Thereby, during normal power operations, the gate tunneling leakage is eliminated. Moreover, the problem of mistriggering can be prevented.

The advantage and spirit of the invention may be understood by the following recitations together with the appended drawings.

BRIEF DESCRIPTION OF THE APPENDED DRAWINGS

Figure 4A:
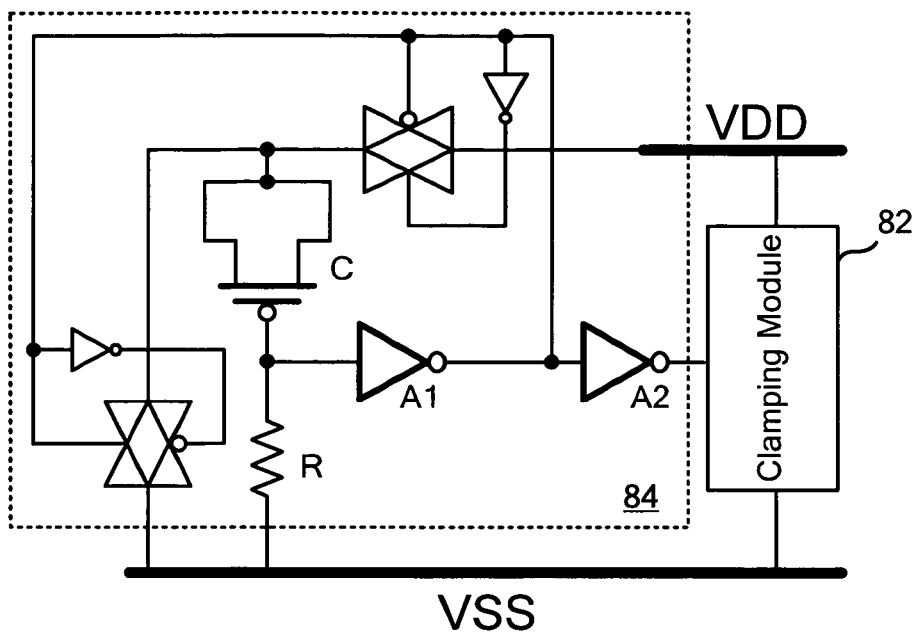
Figure 4B:
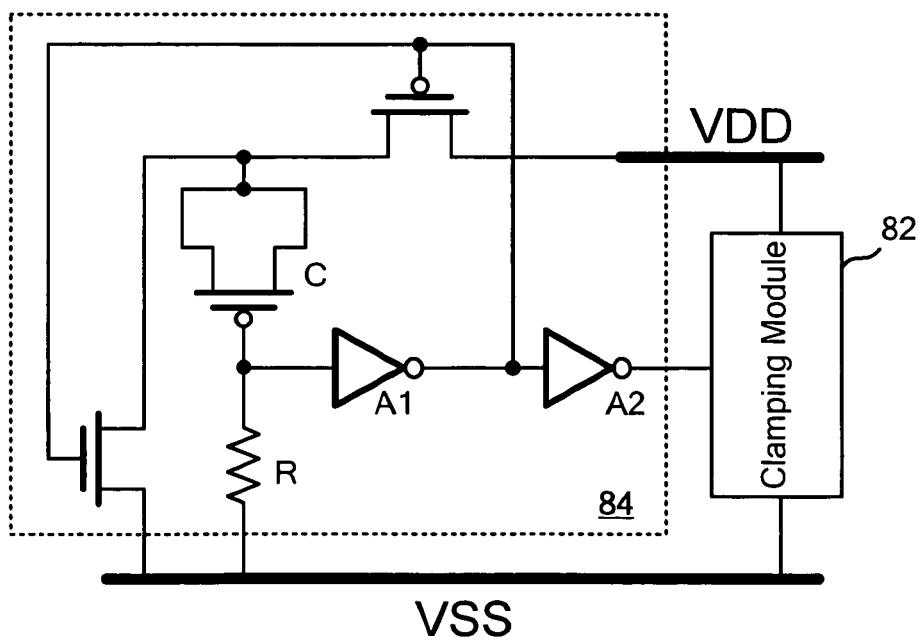

FIG. 4(A) and FIG. 4(B) show exemplary embodiments of the detecting module according to the invention.

Figure 5:
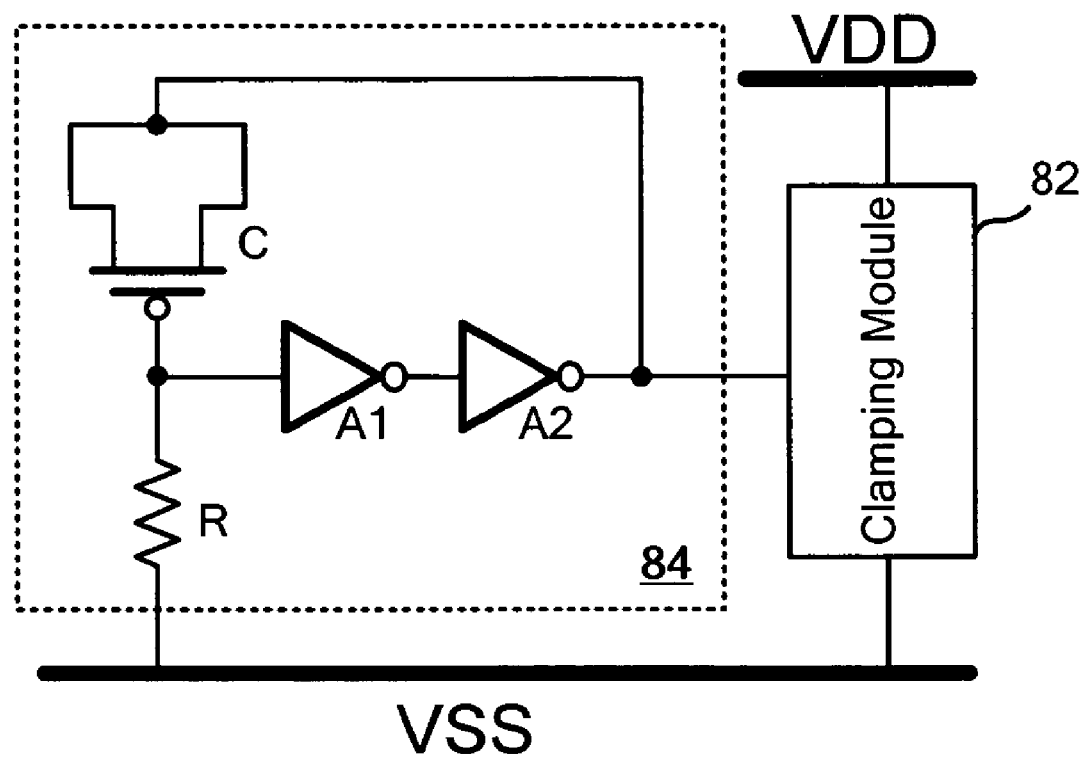

FIG. 5 illustrates a simplified detecting module according to the invention.

DETAILED DESCRIPTION OF THE INVENTION

Figure 3:
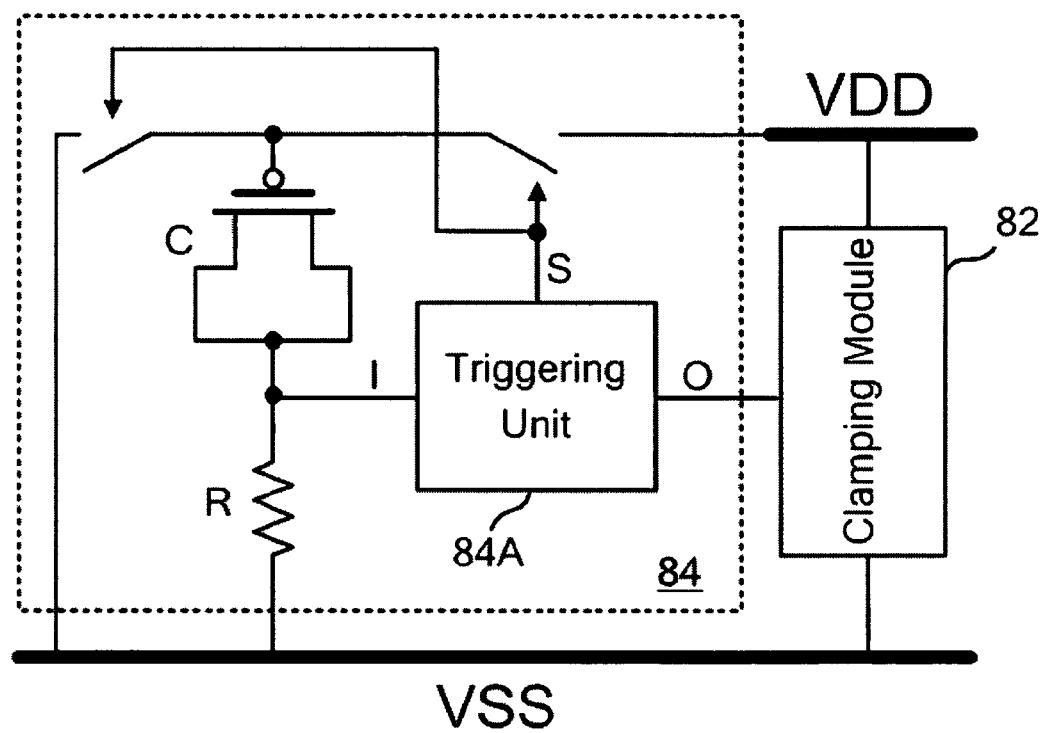
FIG. 3 illustrates an ESD protection circuit in an embodiment according to the invention.

Please refer to FIG. 3, which illustrates the ESD protection circuit in an embodiment according to the invention. This ESD protection circuit includes a clamping module 82 and a detecting module 84. As shown in FIG. 3, the clamping module 82 is coupled between a positive power line (VDD) and a negative power line (VSS). The detecting module 84 includes a triggering unit 84A, a resistor (R), and a MOS gate oxide capacitor (C).

The triggering unit 84A has an input terminal (I), an output terminal (O), and a switching terminal (S). The output terminal (O) is coupled to and used for triggering the clamping module 82. The resistor, which can be replaced as a MOS resistor, is coupled between negative power line (VSS) and the input terminal (I). A first end of the capacitor is also coupled to the input terminal (I), and a second end of the capacitor is selectively coupled positive power line (VDD) or negative power line (VSS).

In this embodiment, the thin gate oxide MOS capacitor is a PMOS with its gate terminal as the first end; the source, drain and bulk terminals of the PMOS are coupled together as the second end. In other applications, the PMOS can be replaced by an NMOS. In practice, the first end and the second end can be swap.

Figure 1:
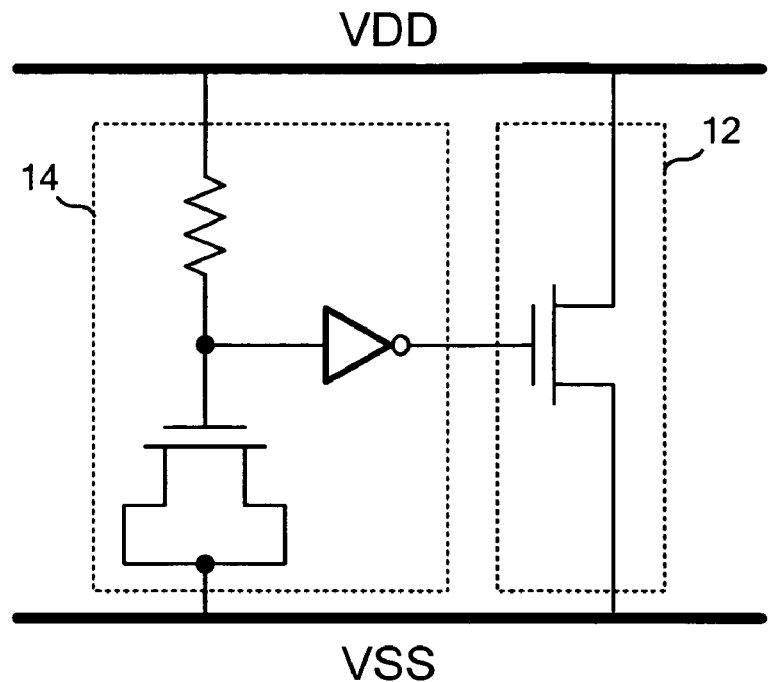
FIG. 1 and FIG. 2 show ESD circuits disclosed in prior arts.
Figure 2:
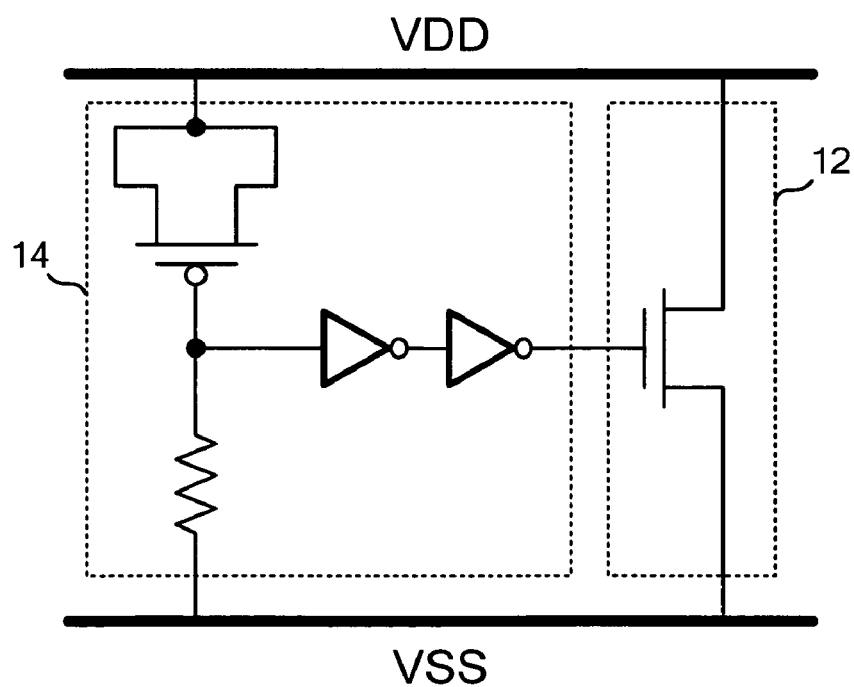

According to the invention, in an ESD event, the switching terminal (S) enables the second end of the capacitor to be coupled with VDD. Thereby, the capacitor and the resistor are connected in series between VDD/VSS and function as the CR combination in FIG. 2.

On the contrary, during normal power operations, the switching terminal (S) enables the second end of the capacitor to be coupled with VSS. In this configuration, both ends of the capacitor are substantially coupled to VSS. Hence, there is nearly no gate tunneling leakage through the capacitor. Further, since the voltage at the input terminal (I) will not be affected by gate tunneling leakage, and the problem of mistriggering is accordingly prevented.

FIG. 4(A) and FIG. 4(B) show exemplary embodiments of the detecting module 84. In these two examples, the triggering unit 84A includes two inverters (A1 and A2). The output end of the inverter A2 is the output terminal (O). The output end of the inverter A1 is the switching terminal (S). In FIG. 4(A), the switches controlled by the switching terminal (S) respectively comprise an inverter and a transmission gate. In FIG. 4(B), the switch between VDD and the capacitor is a PMOS; the switch between VSS and the capacitor is an NMOS.

Moreover, it can be seen the two MOSs functioning as switches in FIG. 4(B) are equivalent to an inverter. Therefore, the circuit in FIG. 4(B) can be further simplified into that shown in FIG. 5.

According to the invention, the thin gate oxide MOS capacitor in the ESD detecting unit is coupled to different power lines during normal power operation and in an ESD event. Because the two ends of the capacitor are substantially coupled to the same power line, the problems of gate tunneling leakage and mistriggering can be effectively prevented.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An electrostatic discharge (ESD) protection circuit, comprising:
 a clamping module coupled between a positive power line and a negative power line; and
 a detecting module, comprising:
 a triggering unit having an input terminal, an output terminal, and a switching terminal, the output terminal being coupled to and used for triggering the clamping module;
 a resistor coupled between the negative power line and the input terminal of the triggering unit; and
 a MOS capacitor having a first end and a second end, the first end being coupled to the input terminal of the triggering unit;
 wherein during a normal power operation, the switching terminal of the triggering unit enables the second end of the MOS capacitor to be coupled with the negative power line; in an ESD event, the switching terminal of the triggering unit enables the second end of the MOS capacitor to be coupled with the positive power line.

2. The ESD protection circuit of claim 1, wherein the triggering unit comprises:
 a first inverter having a first input end and a first output end, the first input end being the input terminal of the triggering unit, the first output end being the switching terminal of the triggering unit;
 a second inverter having a second input end and a second output end, the second input end being coupled to the first output end, the second output end being the output terminal of the triggering unit;
 a first switch controlled by the switching terminal and coupled between the MOS capacitor and the negative power line; during the normal power operation, the first switch being switched to couple the second end of the MOS capacitor with the negative power line; and
 a second switch controlled by the switching terminal and coupled between the MOS capacitor and the positive power line; in the ESD event, the second switch being switched to couple the second end of the MOS capacitor with the positive power line.

3. The ESD protection circuit of claim 2, wherein the first switch and the second switch respectively comprise transmission gates, and inverters.

4. The ESD protection circuit of claim 2, wherein the first switch comprises an NMOS; the second switch comprises a PMOS.

5. The ESD protection circuit of claim 2, wherein the triggering unit further comprises M second inverters coupled between the second output end and the clamping module, and M is an even number.

6. The ESD protection circuit of claim 1, wherein the MOS capacitor is a PMOS, a gate terminal of the PMOS is the first end; a source terminal and a drain terminal of the PMOS are coupled together as the second end.

7. The ESD protection circuit of claim 1, wherein the resistor is replaced as a MOS resistor.

8. The ESD protection circuit of claim 1, wherein the MOS capacitor is an NMOS, a gate terminal of the NMOS is the second end; a source terminal and a drain terminal of the NMOS are coupled together as the first end.

9. The ESD protection circuit of claim 1, wherein the triggering unit comprises:
 a first inverter having a first input end and a first output end, the first input end being the input terminal of the triggering unit, the first output end being the switch terminal of the triggering unit; and
 a second inverter having a second input end and a second output end, the second input end being coupled to the first output end, the second output end being the output terminal and the switching terminal of the triggering unit.

* * * * *